(12) United States Patent
Olsen et al.

(10) Patent No.: US 8,822,936 B2
(45) Date of Patent: Sep. 2, 2014

(54) DETECTOR FOR DETECTING PARTICLE RADIATION OF AN ENERGY IN THE RANGE OF 150 EV TO 300 KEV, AND A MATERIALS MAPPING APPARATUS WITH SUCH A DETECTOR

(75) Inventors: Ulrik Lund Olsen, Lyngby (DK); Henning Friis Poulsen, Roskilde (DK); Soren Schmidt, Copenhagen Ø (DK)

(73) Assignee: Danmarks Tekniske Universitet, Lyngby (DK)

(*) Notice: Subject to any disclaimer, the term of this patent is extended or adjusted under 35 U.S.C. 154(b) by 1154 days.

(21) Appl. No.: 12/681,333

(22) PCT Filed: Oct. 4, 2007

(86) PCT No.: PCT/DK2007/050140
§ 371 (c)(1),
(2), (4) Date: Apr. 1, 2010

(87) PCT Pub. No.: WO2009/043347
PCT Pub. Date: Apr. 9, 2009

(65) Prior Publication Data
US 2010/0276605 A1    Nov. 4, 2010

(51) Int. Cl.
*G01T 1/24* (2006.01)
*G01J 5/02* (2006.01)

(52) U.S. Cl.
USPC ............ 250/370.01; 250/370.09; 250/370.14; 250/372

(58) Field of Classification Search
USPC ............... 250/370.01, 370.1, 370.09, 370.14, 250/372, 336.1; 378/156, 51, 62
See application file for complete search history.

(56) References Cited

U.S. PATENT DOCUMENTS

| | | | |
|---|---|---|---|
| 4,411,059 A | 10/1983 | Schlosser et al. |
| 4,942,302 A | 7/1990 | Koechner |
| 5,525,803 A | 6/1996 | Watanabe et al. |
| 6,153,882 A | 11/2000 | Nygard |

(Continued)

FOREIGN PATENT DOCUMENTS

| | | |
|---|---|---|
| DE | 4229315 A1 | 3/1994 |
| DE | 19711849 A1 | 9/1998 |
| GB | 2265753 A | 10/1993 |
| WO | 0057205 A1 | 9/2000 |

OTHER PUBLICATIONS

Research Papers; Journal of Applied Crystallography; Tracking: a method for structural characterization of grains in powders or polycrystals; Lauridsen; 2001; 34, 744-750.

(Continued)

*Primary Examiner* — David Porta
*Assistant Examiner* — Yara B Green
(74) *Attorney, Agent, or Firm* — Sughrue Mion, PLLC

(57) ABSTRACT

Detector for detection of particle radiation, particularly particle radiation having an energy in the range of 150 eV to 300 keV, comprising at least one detector element, said detector element comprising a semiconductor detector material, at least a set of line-shaped electrodes conductively connected to at least one surface of said semiconductor detector material, each set comprising a plurality of line-shaped electrodes extending in parallel, and signal processor communicating with said line-shaped electrodes, wherein, in each set, said line-shaped electrodes are distributed with a strip pitch of less than 3 μm, and that the thickness of said semiconductor detector material is of less than two times the strip pitch of said line-shaped electrodes.

35 Claims, 9 Drawing Sheets

(56) References Cited

U.S. PATENT DOCUMENTS

Figure 1:
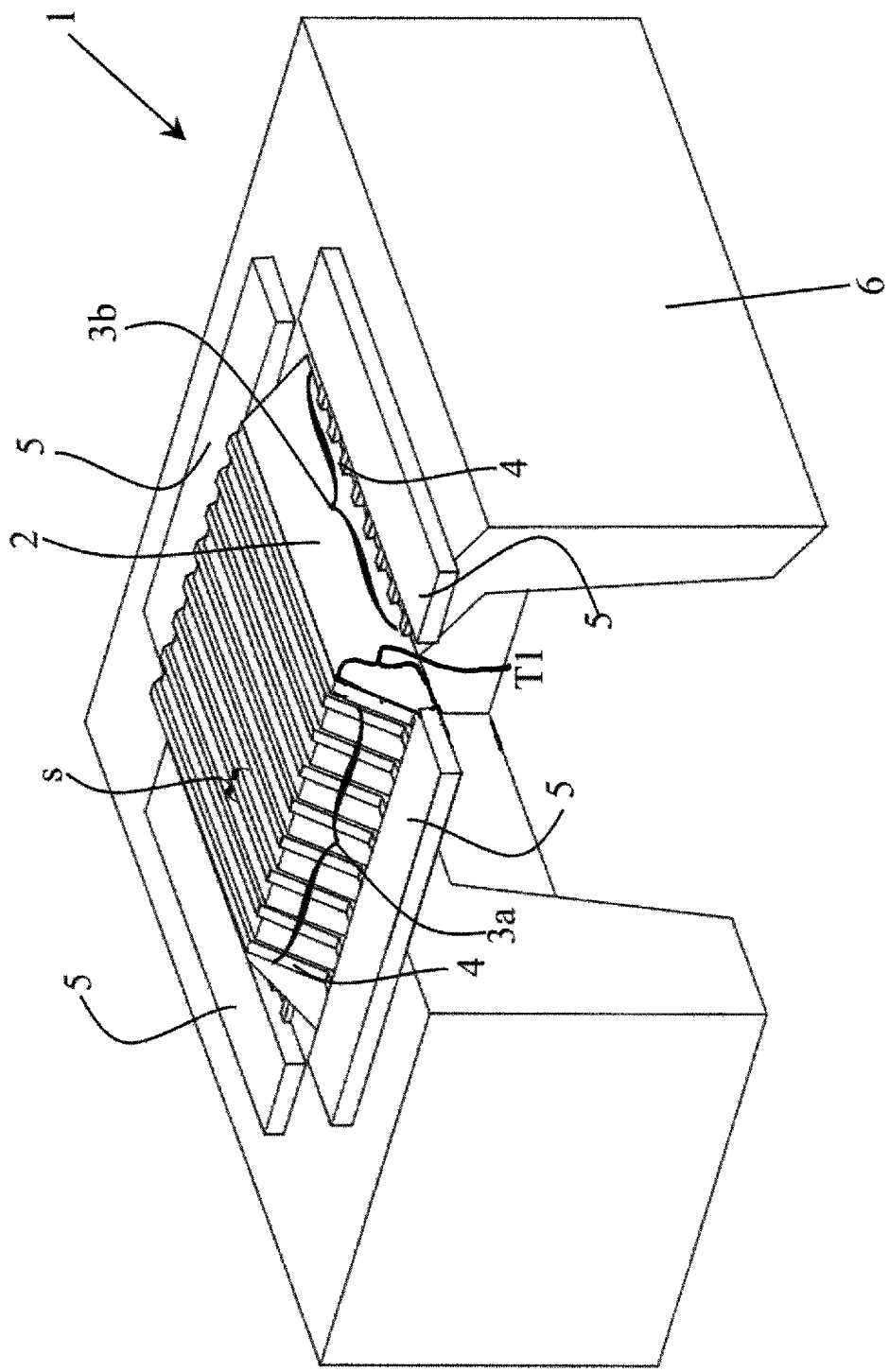

| | | | |
|---|---|---|---|
| 6,169,287 | B1 | 1/2001 | Warburton |
| 6,191,422 | B1 | 2/2001 | Thurston |
| 6,329,658 | B1 | 12/2001 | Mestais et al. |
| 6,744,052 | B1 | 6/2004 | Petersson et al. |
| 6,770,901 | B1 * | 8/2004 | Ogawa et al. .............. 250/591 |
| 2001/0011701 | A1 | 8/2001 | Such et al. |
| 2001/0032935 | A1 * | 10/2001 | Takahashi ............... 250/385.1 |
| 2004/0094720 | A1 | 5/2004 | Dagan et al. |
| 2004/0096031 | A1 | 5/2004 | Caria et al. |
| 2004/0178461 | A1 | 9/2004 | Protic et al. |
| 2004/0217294 | A1 * | 11/2004 | Zur ........................ 250/370.09 |
| 2004/0227094 | A1 | 11/2004 | Tompa et al. |
| 2005/0072978 | A1 | 4/2005 | Raynor |
| 2005/0104003 | A1 | 5/2005 | Jarron |
| 2005/0104019 | A1 * | 5/2005 | Imai .............................. 250/591 |
| 2006/0192087 | A1 | 8/2006 | Kuszpet et al. |
| 2006/0278943 | A1 | 12/2006 | Turchetta et al. |
| 2007/0051894 | A1 | 3/2007 | Rutten et al. |
| 2007/0069111 | A1 | 3/2007 | Spahn |
| 2007/0152288 | A1 | 7/2007 | Protic et al. |
| 2007/0176109 | A1 | 8/2007 | Bell |
| 2007/0176131 | A1 * | 8/2007 | Takahashi .................... 250/581 |
| 2008/0251730 | A1 | 10/2008 | Ballabriga et al. |

OTHER PUBLICATIONS

J. Opt. Soc. Am. A/vol. 15, No. 7/ Jul. 1998; X-ray imaging with submicrometer resolution employing transparent luminescent screens; Koch, et al.

Research Papers; Journal of Applied Crystallography; X-ray diffraction contrast tomography: a novel technique for three-dimensional grain mapping of polycrystals. I. Direct beam case; Ludwig, et al.; (2008).

Recent Developments in X-ray imaging with micrometer spatial resolution; Martin, et al.; (2006).

Science Direct; Manufacturing and characterization of a modified four-quadrant position sensitive detector for out-door applications; Mattsson, et al.; (2004) 134-139.

Simulation of photon and charge transport in X-ray Imaging semiconductor sensors; Nuclear Instruments and Methods in Physics Research, Nilsson, et al. 487 (2002) 151-162.

IEEE Transactions on Nuclear Science, vol. 51. No. 4, Aug. 2004; Monte Carlo Simulation of Charge Sharing Effects in Silicon and GaAs Photon-Counting X-Ray Imaging Detectors; Nilsson, et al.

Nuclear Instruments and Methods in Physics Research A 452 (2000) 155-166; Three-dimensional position sensing and field shaping in orthogonal-strip germanium gamma-ray detectors; Amman, et al. (2000).

Nuclear Instruments and Methods in Physics Research A326 (1993) 189-197; Measurement of the spatial resolution of double-sided double-metal AC-coupled silicon microstrips detectors; Brenner, et al.

Review of Scientific Instruments 76, 043702 (2005); Fast microtomography using high energy synchrotron radiation; Di Michiel, et al.

Hydrogen silsesquioxane/novolak bilayer resist for high aspect ratio nanoscale electron-beam lithography; Falco, et al.; J. Va. Sci. Technol. B 18 (6), Nov./Dec. 2000 0734-211X/2000/18(6)/3419/5.

Journal of Applied Crystallography; Jan. 16, 2008; x-ray diffraction contrast tomography: a novel technique for three-dimensional grain mapping of polycrystals. II. The combined case; Johnson, et al.

Science Direct; (2003); 3D-characterisation of microstructure evolution during annealing of a deformed aluminum single crystal; Poulsen, et al.

Science Direct; Nuclear Instruments and Methods in Physics Research (2005); Development of 3D detectors featuring columnar electrodes of the same doping type; Piemonte, et al.

Journal of Applied Crystallography; Aug. 30, 2001; Three-dimensional maps of grain boundaries and the stress state of individual grains in polycrystals and powders; Poulsen, et al.

Journal of Applied Crystallography; May 19, 2003; Generation of grain maps by an algebraic reconstruction technique; Poulsen, et al.

Science Direct; Acta Materialia 51 (2003); Lattice rotations of individual bulk grains Part I: 3D X-ray characterization; Poulsen, et al.

A Large Area CMOS Monolithic Active Pixel Sensor for Extreme Ultra Violet Spectroscopy and Imaging; Prydderch, et al., 2004.

Development of Silicon Strip Detectors for a Medium Energy Gamma-Ray Telescope; Schopper, et al.; IEEE; (2001).

Two Approaches to hybrid X-ray pixel array readout; Seller, Oct. 1999.

Small size X-pinch radiation source for application to phase-contrast x-ray radiography of biological specimens; IEEE (2003); Song, et al.

A Radiographic Imaging System Based Upon a 2-D Silicon Microstrip Sensor; IEEE; 2001; Papanestis.

Nanoimaging with a compact extreme-ultraviolet last; Optics Letters; Aug. 15, 2005/ vol. 30. No. 16; Vaschenko, et al.

* cited by examiner

DETECTOR FOR DETECTING PARTICLE RADIATION OF AN ENERGY IN THE RANGE OF 150 EV TO 300 KEV, AND A MATERIALS MAPPING APPARATUS WITH SUCH A DETECTOR

A detector for detecting particle radiation of an energy in the range of 150 eV to 300 keV, and a materials mapping apparatus with such a detector.

CROSS REFERENCE TO RELATED APPLICATIONS

This application is a National Stage of International Application No. PCT/DK2007/050140 filed Oct. 4, 2007, the contents of which is incorporated herein by reference in its entirety.

The present invention relates in a first aspect to a detector for detecting particle radiation of an energy in the range of 150 eV to 300 keV, said detector having at least one detector element, which detector element comprises a semiconductor detector material in a detector area, at least one set of line-shaped electrodes, which electrodes extend in the detector area and are conductively connected to at least one surface of the semiconductor detector material, and signal processors communicating with said line-shaped electrodes.

Detectors capable of detecting high energetic particle radiation are used in a wide range of applications in which a sample of some material is investigated in search for specific properties of the sample by the use of high-resolution images.

In the present context the expression "particle radiation" shall be understood as covering photons, electrons, positrons, X-rays or EUV light, or other particles, having energies in the range from 150 eV to 300 keV.

The term photon, when used in the present application to describe the event of impact in the detector material, is to be understood broadly as comprising both the impact of an actual photon, but also impact of another type of particle emitted by particle radiation.

A detector of this type with two sets of parallel line-shaped electrodes is known from the article "Measurement of the spatial resolution of double-sided double-metal AC-coupled silicon microstrips detectors" by R. Brenner et al., Nuclear Instruments and Methods in Physics Research A326 (1993) p. 189-197. The parallel electrodes are located on two opposed sides of a silicon wafer having a thickness of 280 µm, and the one set of line-shaped electrodes is composed of 5 µm wide wires distributed with a strip pitch of 25 µm, and the other set of line-shaped electrodes is composed of 5 µm wide wires distributed with a strip pitch of 50 µm.

Another detector having sets of parallel, line-shaped electrodes is described in "A Radiographic Imaging System Based Upon a 2-D Silicon Microstrip Sensor" by A. Papanestis et al., 2001 IEEE, pages 3-1 to 3-5. In this detector the parallel electrodes are located on a silicon wafer having a thickness of 300 µm or 500 µm, and the one set of line-shaped electrodes has electrodes that are distributed with a strip pitch of 50 µm (on the p-side), and the other set of electrodes (on the n-side) has a strip pitch of 80 µm.

It is a desire to obtain a detector of high spatial resolution and accuracy that can be used in connection with particle radiation, such as radiation from a source of the one of following types EUV, x-ray and hard x-ray sources.

With a view to this the detector according to the present invention is embodied in such a manner that the line-shaped electrodes in the individual set are distributed with a strip pitch of at the most 3 µm, and that the semiconductor detector material has a thickness (t) of at the most three times the strip pitch (s) of said line-shaped electrodes.

The high accuracy and high resolution of the detector is obtained on the one hand by making the detector material with a small thickness in comparison to the strip pitch and on the other hand by making the detector material very thin so that single particle position detection can occur with high reliability. For a beam of a given energy, the absorption rate of the detector element is lower when the detector material is thinner, and the lower absorption rate reduces the risks of the inaccuracy caused if two particles are absorbed in the detector material within such a short span of time and in such a localised area that the signals obtained cannot be allocated to the individual particle.

The small thickness of the detector material reduces the required distances of travel for the electrons and the holes in the detector material and minimizes inaccuracies caused by the difference in mobility of the electrons and the holes. And in combination with the very small strip pitch of 3 µm or less, the maximum travel distances in the detector material are so small that the detector element is extremely fast-acting and accurate.

The relationship between the strip pitch and the thickness of the detector material has an effect on the accuracy of the detector. The electric field in the detector material draws electrons in the thickness direction towards the line-shaped electrodes, but the electrons may also be subjected to a thermally induced diffusion in a direction transverse to the thickness direction. When the thickness is at the most three times the strip pitch then the probability of an electrode registering with another electrode than the one closest to the point of initiation of electron travel is believed to be less than about 1 percent.

The high reliability of the signals obtained from the electrodes due to the small thickness in combination with the ratio between strip pitch and thickness improves the accuracy of the detector, and in addition the strip pitch of at the most 3 µm in itself provides the detector with a spatial resolution that is more than a factor 10 higher than the resolution of the prior art detectors with parallel line-shaped electrodes.

The small thickness of the detector material in relation to the strip pitch also has an additional effect that improves the accuracy of the detector. When a particle impacts the detector material, the impact will generate a release of many pairs of electrons and holes in a cloud-shaped pattern evenly expanding from the point of impact. The small thickness of the detector material in relation to the strip pitch only allows the cloud-shaped pattern to extend a short distance in directions transverse to the thickness direction, and consequently the electron-hole pairs are generated within a relatively small area of the detector.

The small thickness in relation to the strip pitch has also the effect of reducing blur caused by Compton scattering and high-energy fluorescence, because a deflected particle will typically only travel a short distance sideways before it exits the detector material, and the possibility of multiple interactions is negligible.

The small diffusion distances and the resulting fastness are furthermore advantageous in that recombination is negligible, because the electrons diffuse to an electrode before they can recombine with a hole. The detector element can thus very accurately register the amount of charge released in the detector material.

In a preferred embodiment, a processing unit in the detector is provided with a filter for Compton scattered particle activity and/or high-energy fluorescence activity, where high-energy is understood as fluorescence activity involving the K-shell. The fast and accurate collection of the charge released in the detector material allows a signals processing unit to filter-off particle activity related to Compton scattering and/or high energy fluorescence activity. This may be done by comparing the amount of charge registered for a single particle event with a predetermined lower limit value, and if the amount of charge is below the limit the signals pertaining to the particle is filtered off—or classified as a Compton scattered particle or fluorescence activity. The quality of the picture obtained by the detector is improved by such removal of the noise caused by Compton scattering or fluorescence activity. With filters of this type it is possible to classify the detected signals according to their origination, e.g. into signals resulting from elastic scattering, signals resulting from inelastic scattering, signals resulting from electron emission and signals from absorption of photons. On basis of such classification the image quality may be improved by removal of unwanted signals, or correction of erroneous signals.

In an embodiment the spatial resolution of the detector is further improved by arranging the line-shaped electrodes in the individual set so that they are distributed with a strip pitch of less than 2 µm. This effect has been further enhanced in another embodiment where the line-shaped electrodes are arranged with the most preferred strip pitch of about 1 µm. The line-shaped electrodes may e.g. be placed on the semi-conductor material by an E-beam, and the strip pitch of 1 µm provides the detector with a direct spatial resolution of 1 µm, based on simple sampling of the strongest signals in the electrodes, and with spatial resolutions in the sub-micrometer range (nano-scale) by calculating on the signals obtained from the electrodes.

The individual line-shaped electrode has preferably a width of at the most 20 percent of the strip pitch of said line-shaped electrodes. This relatively small width of the electrode leaves the majority of the detector surface unobstructed and free to receive a particle impact. If the high-energetic particle impact occurs only in the detector material it creates a cloud of multiple, low-energetic exitons, which activate the pairs of electrons and holes in the detector material and are registered in the electrodes adjacent to the point of impact. But if the particle on the other hand hits the electrode it may cause a high signal from the electrode, which may disturb the registration of the exitons. It is consequently preferred that the width of the electrode is as small as possible. The electrode may in some embodiments have a width, which is larger than 20 percent of the strip pitch, such as 25 percent thereof or more. This can be used to lower the electrode resistivity, but it is not preferred. A lower resistance may alternatively be obtained by adding material to the lines in the thickness direction.

The choice of detector material depends on the energy in the beam emitted from the source of radiation. When the beam has an energy at the lower end of the range, such as an energy of 300 eV, silicon may be a preferred detector material, whereas for beams having considerably higher energy the semiconductor detector material may comprise at least one constituent metallic element having an atomic number (Z) higher than 14. Such materials have higher density than silicon and thus absorb incident radiation with higher efficiency. For the detector according to the invention this is in particular relevant for hard X-ray beams (i.e. beam energies above about 10 keV), which due to the high energies involves a lower risk of inaccuracy caused by a double particles absorption within a detection area utilized for single particle detection. It is thus possible without sacrificing accuracy to increase the absorption rate by using a more dense material than silicon, and in this manner the efficiency of the individual detector element is increased.

Preferably, the choice of detector material is effected so that there is a direct band-gab between the electron levels that are sufficiently low to produce good statistics on the number of generated electron-hole pairs, but high enough to avoid any significant noise due to thermal excitation at room temperature. Pure semiconductors having an atomic number higher than 14 are useable as absorbing material. The semiconductor can also be compound semiconductors.

Preferably, the semiconductor detector material is selected from the group comprising InP, CdZnTe (CZT), CdTe, $HgI_2$, GaAs, $PbI_2$, TlBr, $BiI_3$, HgCdTe, HgZnTe, InSb, or variants thereof, such as PbTe, HgTe/CdTe, or HgTe/ZnTe combinations. Among the most preferred materials are InP, $HgI_2$ and CdZnTe.

In an embodiment of the detector according to the present invention the individual detector element has only a single set of line-shaped electrodes. Such a detector element can be used as such, in detectors where high spatial resolution is only required in a single direction, or the high spatial resolution can be obtained in two dimensions by calculating on the signals detected by the line-shaped electrodes. Such calculation may be based on time differences or change rates in the detected signals, as is explained in further detail in the following.

In another embodiment the individual detector element comprises at least two sets of line-shaped electrodes, and in this case the one set of line-shaped electrodes extend in a first direction and the other set of line-shaped electrodes extend in a second direction, which typically is different from said first direction. It is preferred that the spatial resolution of the individual detector element is at least two-dimensional (2D), and this may be obtained directly by the geometry of the sets of line-shaped electrodes in that the first direction is not parallel with the second direction, so that the first direction intersects the second direction in a projection on a plane perpendicular to the beam path. The first and the second directions may be chosen so that in the projection the line-shaped electrodes create a pattern of diamond-shapes in which the size of the included apex angle can take any desired value by selecting the first and the second directions accordingly, but as the resolution in that case would be different in one direction from another, it is preferred that the at least two sets of line-shaped electrodes extend in mutually perpendicular directions. In the latter embodiment the projection of the line-shaped electrodes create a rectangular pattern in a plane perpendicular to the beam path, which for a given strip pitch produces the finest resolution. It is furthermore preferred that the strip pitch of the one set of line-shaped electrodes is substantially the same as the strip pitch of the second set of line-shaped electrodes, but it is naturally also possible to arrange the one set of electrodes with a larger strip pitch than the other set of electrodes.

The signal processors on the detector element preferably comprise signal collecting means and signal readout means, which signal readout means have a readout capability of at least 8,000 frames per second (8 kfps). This readout capability provides the detector element with the capability of registering signals with a speed allowing single particle position detection, in particular when the signal collecting means collect selectively from line-shaped electrodes that carry current, and thus only needs to read from the electrodes that are actually activated by particle impacts.

In a preferred embodiment the signal readout means have a readout capability of at least 40,000 frames per second (40 kfps) which, for a given strip pitch and a given sensitivity in the time domain, allows the detector element to cover a larger area because it can have more electrodes.

In order to further improve the spatial resolution of the detector element the signal processors, or a number of central processors, are adapted to determine the position of the impact of an incoming particle with better spatial resolution (σ) than the strip pitch (s) of said line-shaped electrodes, preferably with a spatial resolution σ<s/4. It is naturally an advantage to improve on the spatial resolution of the detector, and it is comparatively easy to obtain a better resolution than the one given by the geometry in the physical layout of the electrodes. One possibility is to detect the timing of arrival of signals and use the time difference in conjunction with empiric values for diffusion speed as a measure of the distance from the impact point to the electrode.

Another, more preferred manner is utilized in an embodiment where the signal processors, or a number of central processors, determine the position of impact of the individual particle by centre of mass calculations based on signals from several or a plurality of the line-shaped electrodes. Upon impact the high-energetic particle generates a cloud of low-energetic particles, and while this cloud expands it generates typically hundreds or thousands of pairs of electrons and holes in the detector material. At increasing distance from the point of impact the intensity of the pair generation drops (less pairs generated per unit volume of detector material), and the charge induced in the detector material gets correspondingly lower. Because of the very small strip pitch of at the most 3 μm in the detector element, the total charge induced by the impact is distributed over several or a plurality of the line-shaped electrodes, and the charge amounts registered in some of the individual electrodes are very clearly different from the charge amounts registered in others of the electrodes, because of the varying distances from the electrodes to the position of the impact. These differences in registered charge amounts can be utilized in centre of mass calculations where the detected charge amounts from the individual rectangle, which is delineated by four electrodes, are associated with the position of the rectangle, and based on this and traditional centre of mass calculations including all rectangles affected by the impact of the single particle, it is possible to determine the position of the impact with a spatial resolution σ which is at least four times higher than the strip pitch, such as with a spatial resolution which is e.g. 10 or 11 times higher than the strip pitch. In an embodiment where the detector element has a strip pitch of 1 μm and when the centre of mass calculations are utilized to obtain 10 times higher resolution, the detector has a 100 nm spatial resolution in two directions (2D), or even below 100 nm, such as 90.9 nm or below.

A third possibility is utilized in an embodiment that determines the position of impact of the individual particle by using time dependent signals from at least one line-shaped electrode. This may e.g. be a time difference in receipt of signals at both ends of the same line-shaped electrode, or it may be based on how quickly a diode connected to the electrode is charged as this can be taken as a measure of the resistance in the portion of the electrode extending from the diode to the impact position. In these manners the position is determined in the length direction of the line-shaped electrodes. The position in the transverse direction can e.g. be determined by comparing the signals from the electrode and from the adjacent electrode, where the time difference in receipt of the signals can be used to determine the position. It is also possible to use a combination of these methods of determining the position of impact.

A fourth possibility is utilized in an embodiment in which the position of impact is determined in the direction transverse to the length direction of the line-shaped electrodes by measuring the signal strength from at least two line-shaped electrodes close to the impact position, and the difference in signal strength can be used to determine the position.

The high accuracy obtained by making the detector material with a maximum thickness in relationship to the strip pitch, and the small strip pitch, have as consequences that the individual detector element has low absorption efficiency when the beam has high energy. In an embodiment that compensates for this a plurality of detector elements is mounted in a stacked configuration. The individual detector element of course preserves its accuracy independent of the presence of the other detector elements, and the overall absorption efficiency of the detector is significantly improved, as the individual absorption efficiencies of the detector elements simply add up to result in the total efficiency of the detector when the detector elements are in stacked configuration where the beam has to pass through one elements after the other from one end of the stack to the other. The stacked configuration provides a further advantage apart from the increase in absorption efficiency, namely a quicker sampling and readout time for a complete picture in very high spatial resolution, because the stacked detector elements function in parallel. For practical purposes, this effect can be important, especially in high-energy applications involving synchrotrons of limited availability. In comparison to the above-mentioned prior art 2D detectors having spatial resolutions in the range of 50 μm or 80 μm, the data processing involved in obtaining a 100 nm spatial resolution would be expected to be significantly more time-consuming, but this is compensated for, at least in part, by the distribution of the desired absorption efficiency out on the many parallel operating detector elements in the stacked configuration.

In an embodiment adapted for three-dimensional characterization of a test specimen two or more detector elements, or two or more stacks of detector elements, are mutually spaced apart in the propagation direction of the beam. Although the detector elements in themselves provide 2D images, it is possible to obtain 3D images by effecting 3D reconstruction computation on the data obtained in associated 2D images collected at different distances from the test specimen, typically at two or three different distances from the test specimen in the down-stream direction of the beam path. In connection with X-ray diffraction such 3D characterisation is, inter alia, described in the articles "Tracking: a method for structural characterization of grains in powders or polycrystals", E. M. Lauridsen et al., Journal of Applied Crystallography, 2001, 34, 744-750; "Three-dimensional maps of grain boundaries and the stress state of individual grains in polycrystals and powders" by H. F. Poulsen et al., Journal of Applied Crystallography, 2001, 34, 750-756; "Generation of grain maps by an algebraic reconstruction technique" by H. F. Poulsen et al., Journal of Applied Crystallography, 2003, 36, 1062-1068; "3D-characterisation of microstructure evolution during annealing of a deformed aluminium single crystal" by H. F. Poulsen et al., Acta Materialia 51 (2003), 2517-2529; "Lattice rotations of individual bulk grains Part I: 3D X-ray characterization" by H. F. Poulsen et al., Acta Materialia 51 (2003), 3821-3830, which articles are hereby incorporated in the description by reference, in relation to 3D characterization.

In a second aspect, the present invention relates to a materials mapping apparatus, comprising a source generating a beam of particles in a beam path, a specimen support positioned at the beam path, and a detector, wherein the detector is a detector of the above-mentioned type according to the first aspect of the present invention.

Use of the detector according to the first aspect of the invention in the apparatus according to the second aspect results in a materials mapping apparatus which for 2D full-area imaging provides a very fast operating apparatus with a spatial resolution of 3 μm or better, such as a resolution of about 100 nm. Such a detector is highly useful in a broad range of technological areas.

One main area of use of the mapping apparatus according to the invention is within the area of low energy beams having wave-lengths of about 2 to 5 nm. Prior art apparatuses in this area suffer from some disadvantages. The beams have a fairly broad bandwidth of typically 100 to 300 wavelengths, which gives rise to chromatic aberrations in the optics in the prior art systems. And the entire system must be evacuated in order to avoid attenuation of the beam. And in the case of LPP (Laser Produced Plasma) sources, there is generated debris from the specimen, which debris ends up being deposited on optics present in the beam path from the source to the specimen, where the debris may cause irregularities or result in damage to coatings, or scratches in the coatings. Furthermore, in connection with the optics required in prior art systems, a grazing angle tandem ellipsoid condenser mirror is used. In order to provide space for the optics and the desired focusing of the beam there may in the prior art systems typically be a distance between source and specimen of 300 mm, along with a distance of 800 mm between the specimen and the location of the detector. The large distance between sample and detector makes the setup very sensible to vibrations or other factors influencing the mechanical stability.

In an embodiment of the mapping apparatus of the present invention, the apparatus comprises a detector located at a distance of less than 20 mm downstream in direction of the beam path from the test specimen support, and the source emits photons having energy in the range of from 200 eV to 600 eV. However, at a distance of 20 mm between the specimen and the detector, the source should be located about 2.5 metres from the specimen in order to yield less distortion than 100 nm. Although it is possible to use even larger distances, it is disadvantageous. It is naturally a significant advantage if the outer dimensions of the mapping apparatus can be reduced, and it is therefore preferred that the distance between detector and specimen is considerably smaller than 20 mm, such as smaller than 2 mm. When the detector is about 2 mm or less from the specimen, the source may be located about 25 cm or less from the specimen, which is ideal for a vertical orientation of the beam path which allows the specimen to be located on a horizontal surface. This is a distinct advantage for specimens included in or containing liquids. The apparatus with the vertically oriented beam may have a very simple design in that the complete beam path from the source via the specimen to the detector can be a straight line (without any bends or zig-zag path, and without optics). As there is no need for optics focusing the beam upstream of the specimen in this apparatus, the specimen can be located close to the source. This preserves more flux from the source due to the significant decrease in distance between the source and the specimen, and as optics are avoided in the beam path to the specimen also optical losses are completely avoided. The short distance allows a source of lower power to produce the required flux through the specimen, and this also facilitates a simple design with high reliability.

The apparatus according to the invention allows that the examination of a specimen is carried out as a contact-less examination. In a further embodiment, the materials mapping apparatus has the distinct advantage in relation to optical microscopes of high resolution that the test specimen may be kept in a sealed chamber, such as a sealed Petri dish. This is made possible by the lacking requirement for optics in contact with the specimen in the beam path. The possibility of using a sealed chamber, and the very high spatial resolution obtained with the detector, provides a nanoscope for live cell specimens, in which pictures of very high resolution are obtained of specimens that are unaffected by the atmosphere present in the apparatus. As the specimen can be kept in a sealed chamber, the handling of the specimen during imaging is facilitated, and there is no, or only an extremely low, risk of escape of cells from the specimen to the surroundings or of penetration of foreign matter from the surroundings into the test specimen. The high-resolution apparatus according to the present invention is also fast in use, first of all because evacuation of air from the space within the apparatus may be dispensed with, and also because the imaging in itself occurs comparatively quickly.

In a further development of the materials mapping apparatus the detector is at a shorter distance from the test specimen than the source, said test specimen including proteins or other materials containing carbon. There is a need for characterising such specimens in an easy manner with high spatial resolution. The omission of optics in the beam path and the use of a highly sensitive detector permit the use of a relatively low energetic source having photons with energy in the range from e.g. 250 eV to 500 eV. And a beam of such low energy may be utilized in visualisation of the specimen without any relevant risk of inflicting radiation damage to the specimen.

In a preferred embodiment especially suitable for imaging of biological specimens containing proteins the detector is adapted to absorb at least 80 percent, and preferably up to 100 percent, of the dose of radiation passing through the specimen during exposure. Because of the high precision of the detector and the lack of optics both between the source and the specimen, but also between the specimen and the detector, it is possible to use a source of suitably small power and yet obtain a flux (flow rate of photons through a unit area) at the detector of sufficient size to obtain high quality images. The photons used have low energies, and it is consequently possible to design the detector so that it completely absorbs the radiation. This can e.g. be done by using one or more stacked detector elements having silicon as detector material, or by using only one detector element having a more dense detector material, like InP. With this high efficiency, there is no longer any need for cooling the specimen during exposure in order to avoid radiation damages. In prior art apparatuses, the specimen was subjected to a flow of cold helium while a picture was exposed, but with the apparatus according to the invention such a complicated setup is no longer required because the specimen can be maintained in unfrozen condition throughout the imaging procedure without suffering noticeable radiation damage. This is in particular advantageous when the specimen is of a type varying with time, such as growing cells, a virus, or the like where high quality images of different stages of growth may provide useful information. Because images can be obtained in an easy manner without freezing the specimen and without causing radiation damage to the specimen, a breakthrough has possibly been achieved in nano-resolution radiographic imaging of live structures.

Preferably, the detector is located less than 0.6 mm from the test specimen during exposure of the image of the biological sample. It is desirable that the separation between the specimen and the detector is as small as possible, and the sample needs to be on a carrier, such as a glass surface, like the bottom surface of a Petri dish, which has a certain thickness. In order to be easy to handle the carrier needs mechanical strength, which calls for a certain wall thickness. In a further embodiment of the apparatus the detector is located less than 0.3 mm, such as about 0.2 mm or about 0.1 mm, from the test specimen during exposure of the image. This can e.g. be obtained by using a thin foil as carrier. As an alternative, the carrier, like a Petri dish, can be manufactured with recessed areas where the bottom wall has only little thickness. In an embodiment of the materials mapping apparatus, the test specimen support includes a specimen carrier surface having a wall thickness of less than 0.2 mm, which specimen carrier surface preferably is provided as a recessed area in a bottom wall of a specimen container. Such a recessed area will also serve as an indication of where the sample should be placed in the container, and it may also facilitate the process of mounting the container in the apparatus.

Another main area of use of the mapping apparatus according to the invention is as a testing or quality control tool, in particular testing or quality control of integrated circuits. The circuits presently made on chips may involve complex structures of many layers, and details in the layers may vary in size from structures having a size of many microns to structures having nanometer size. Due to the high spatial resolution of the detector it is possible to examine the structures having nanometer size, such as an interconnection between wire paths in two different layers of the circuit. The mapping apparatus may for this purpose be utilized in x-ray tomography of the circuit, or in phase contrast imaging. In both cases, the examination of the integrated circuit is a non-destructive testing where the x-ray beam is used as a penetrating probe. The use of the apparatus as a testing or quality control tool can be used in other areas than integrated circuits, e.g. in the paper industry where the sizes of the individual fibres, the distribution of the fibres, and the orientation of the fibres in the bulk of the paper are of importance to the quality of the paper. A third example is examination of composite materials where e.g. fibres are distributed in a matrix of bulk material.

A further main area of use of the mapping apparatus according to the present invention is in testing of metal structures, such as in aeroplane parts, engine parts etc. Such structures have large thicknesses in the order of millimetres. By using a high-energy source, such as a source emitting particles of higher energy than 25 keV, the apparatus can be used in examination of the metal parts over thicknesses of several millimetres. And as for electronic circuits the testing is non-destructive and provides high spatial resolution.

For the low-energetic beam applications it is preferred that the detector has only a single detector element, but in applications involving higher beam energy, such as in the range from 8 keV to 80 keV, the stacked configuration is preferred. The stacked configuration may also be used in the low-energetic beam application, if an increase in absorption efficiency is desirable, e.g. in the case silicon is used as detector material.

Figure 1A:
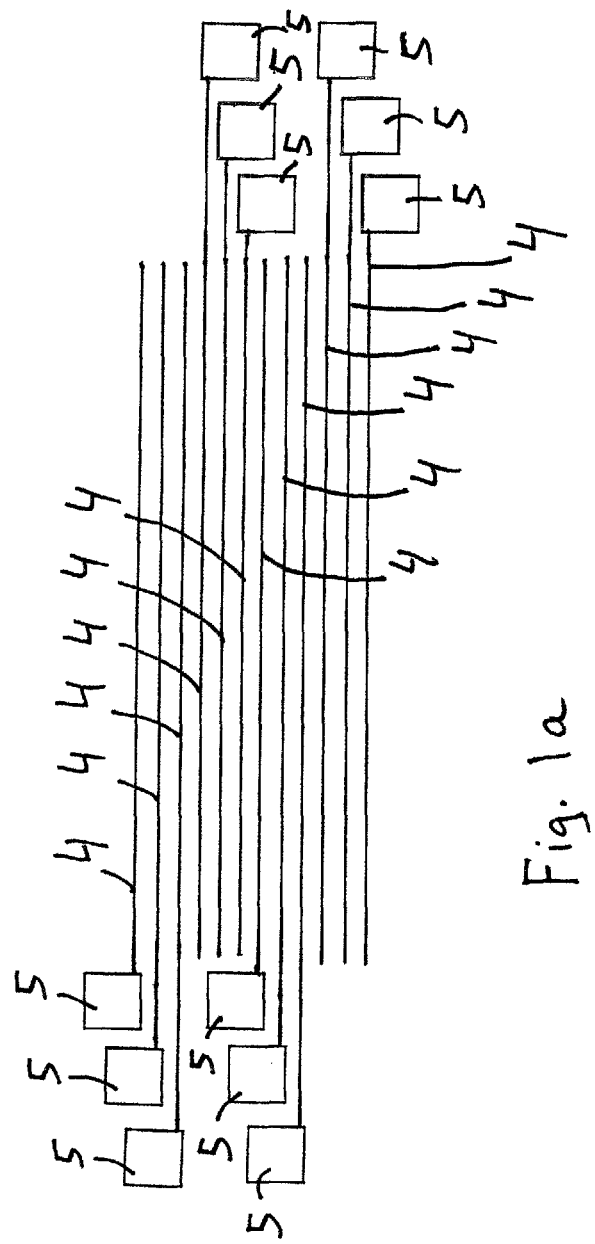
Figure 2:
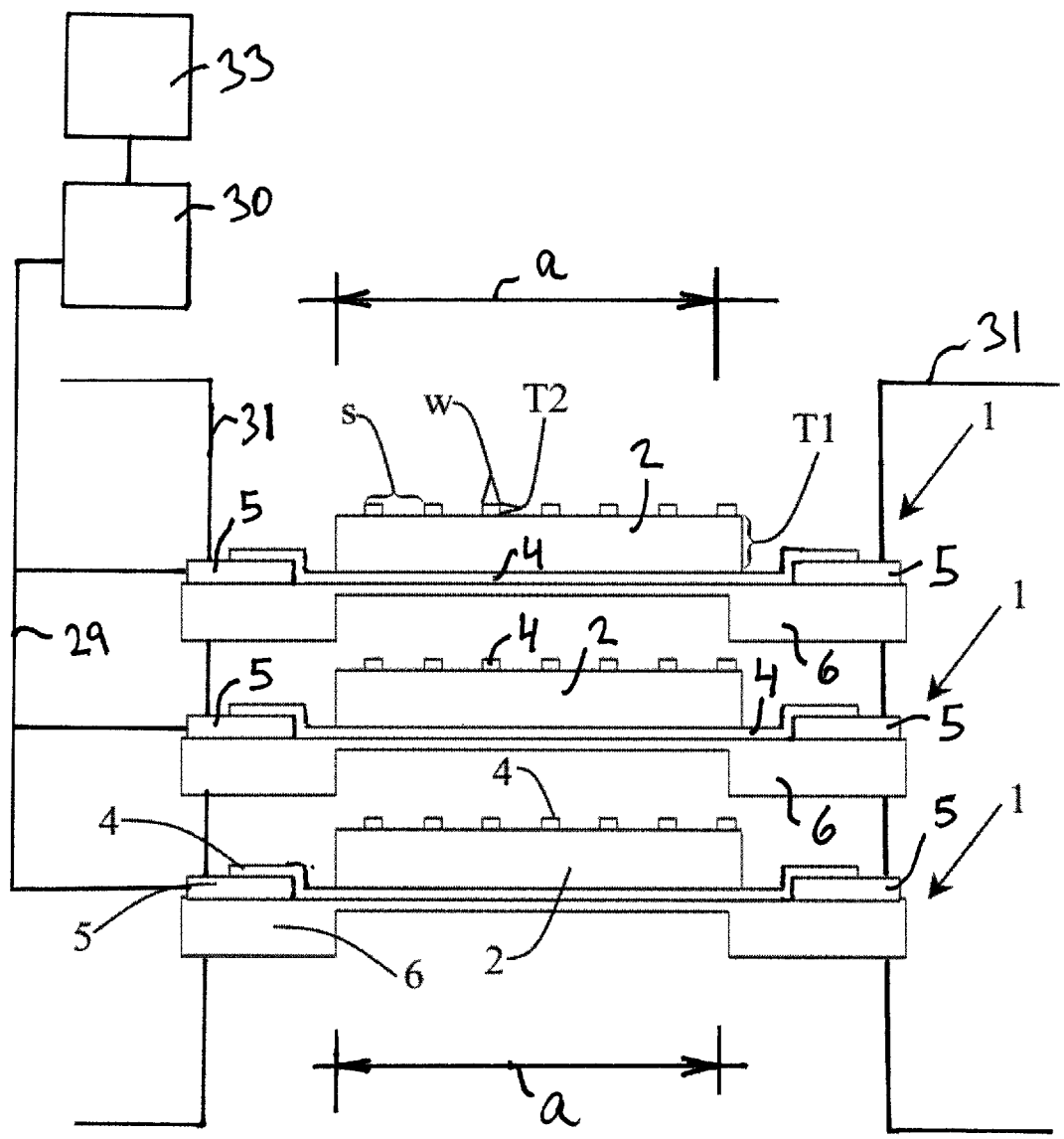
Figure 2A:
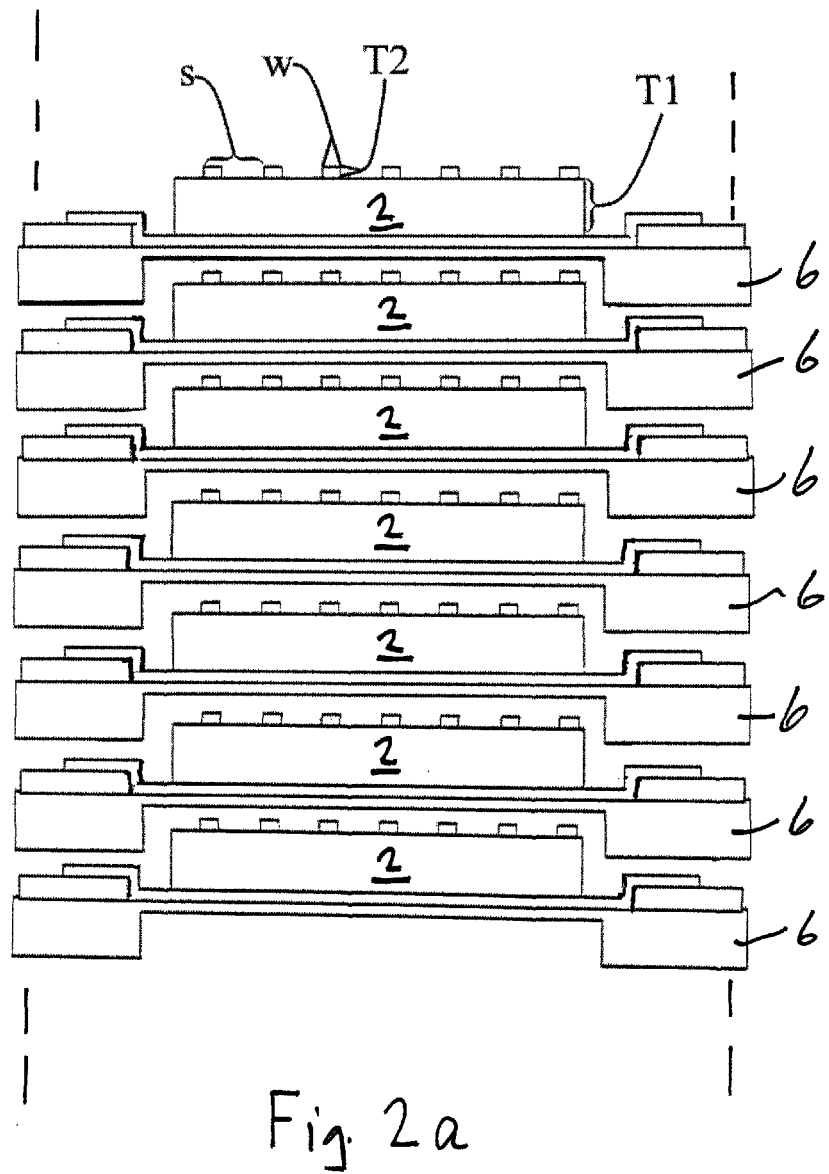
Figure 3:
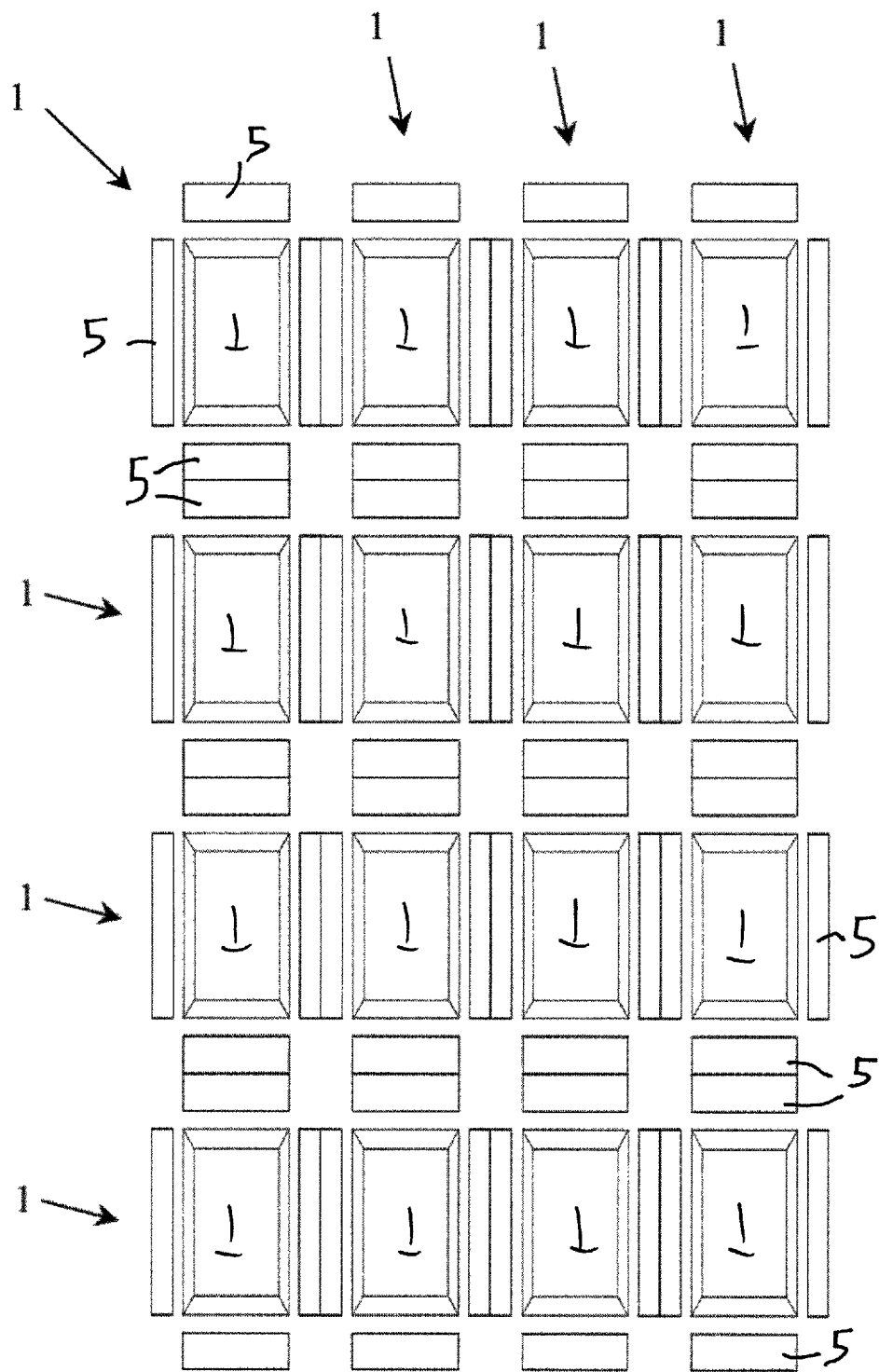
Figure 4:
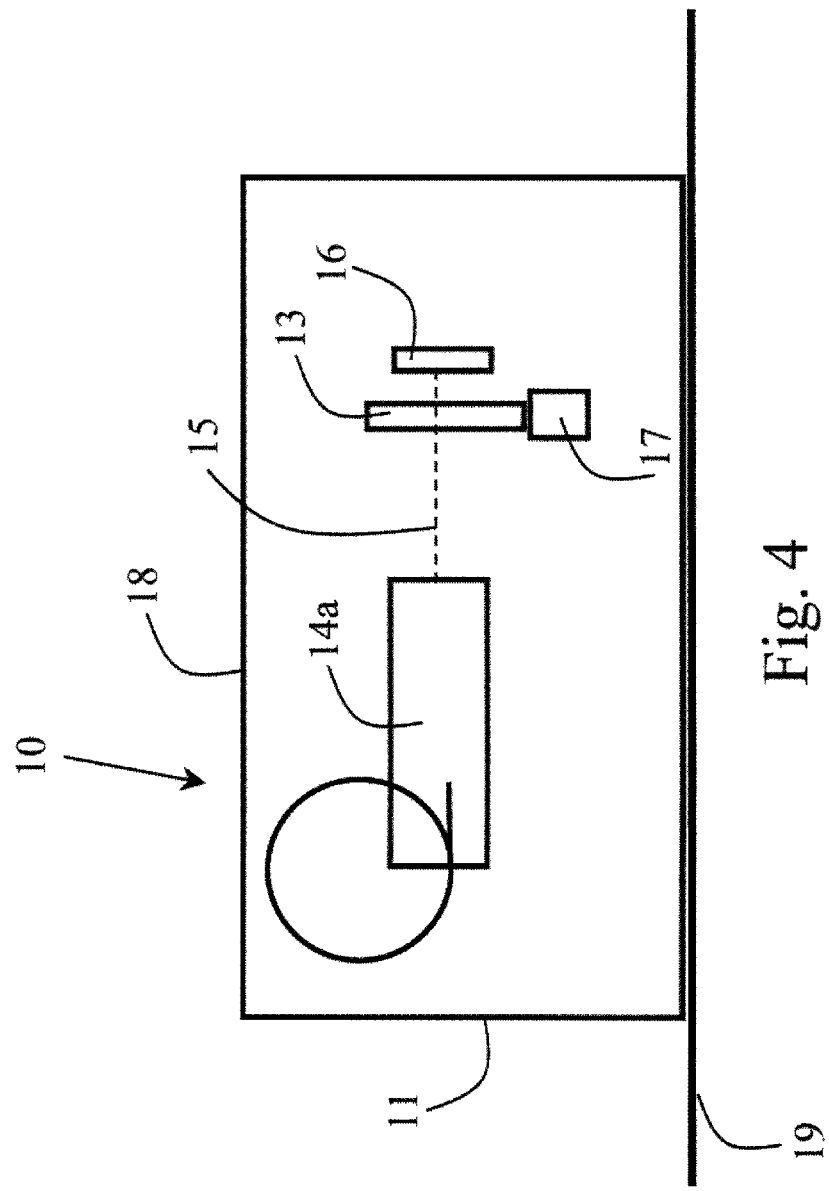
Figure 5:
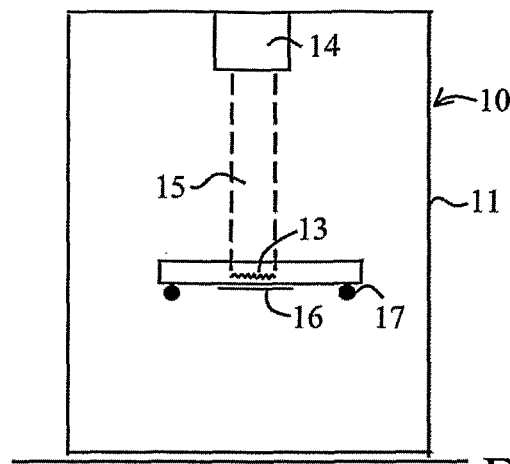
Figure 9:
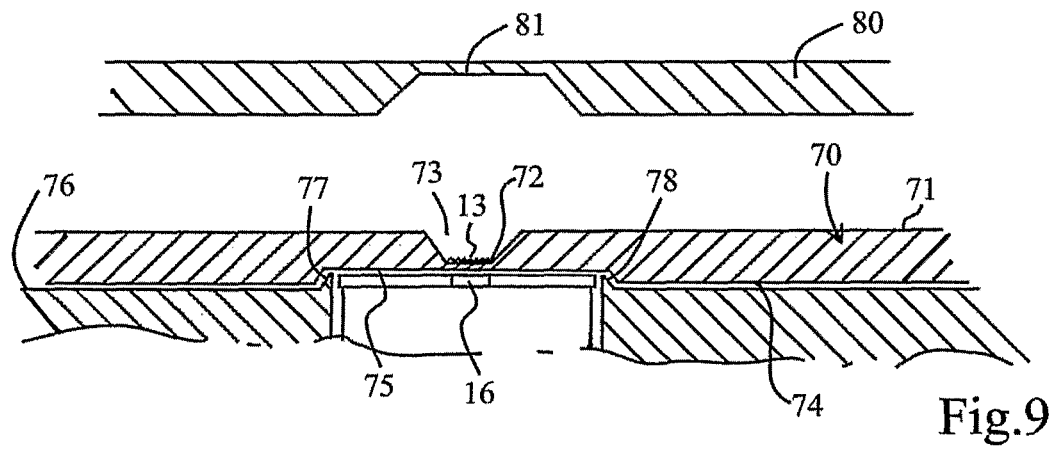
Figure 10:
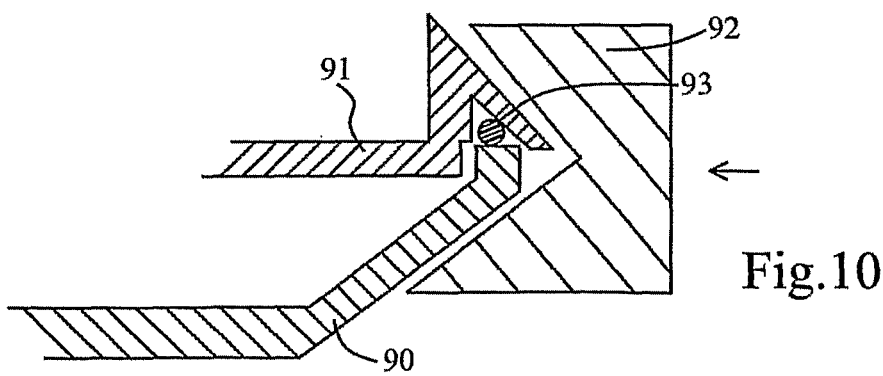
Figure 6:
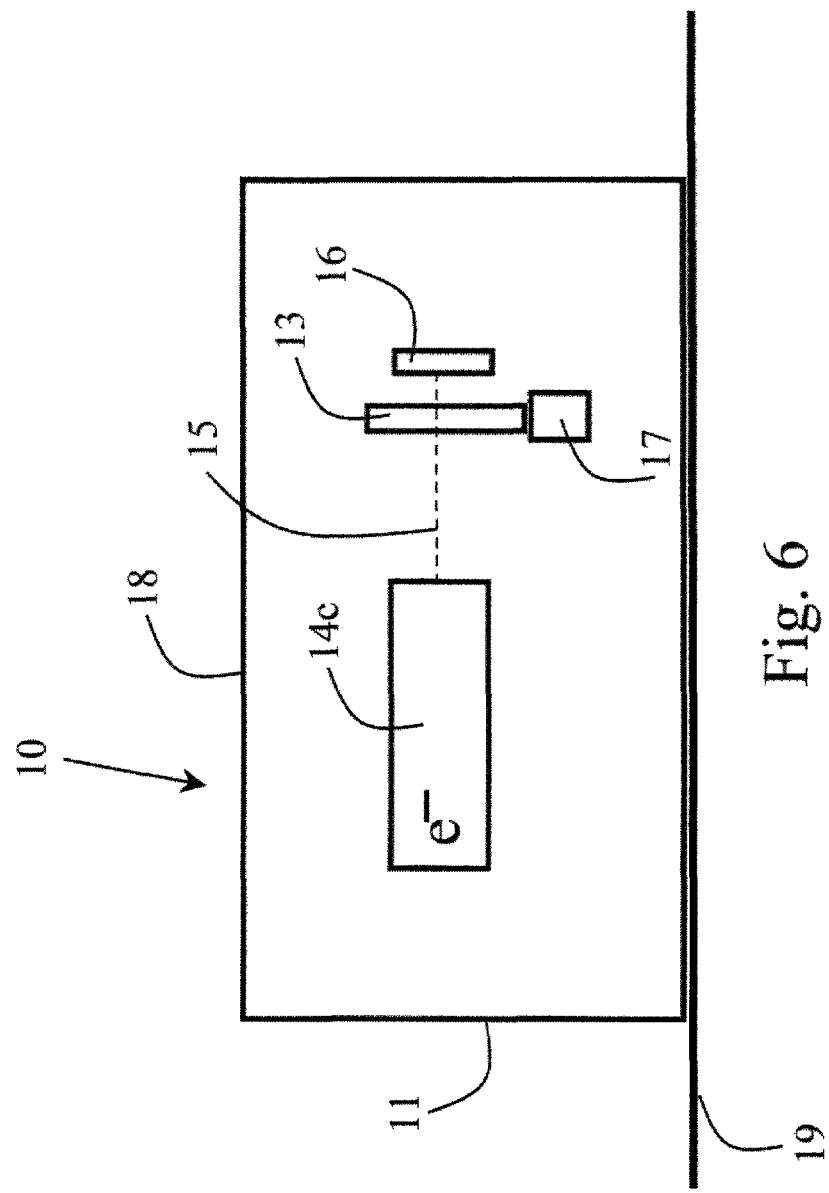
Figure 7:
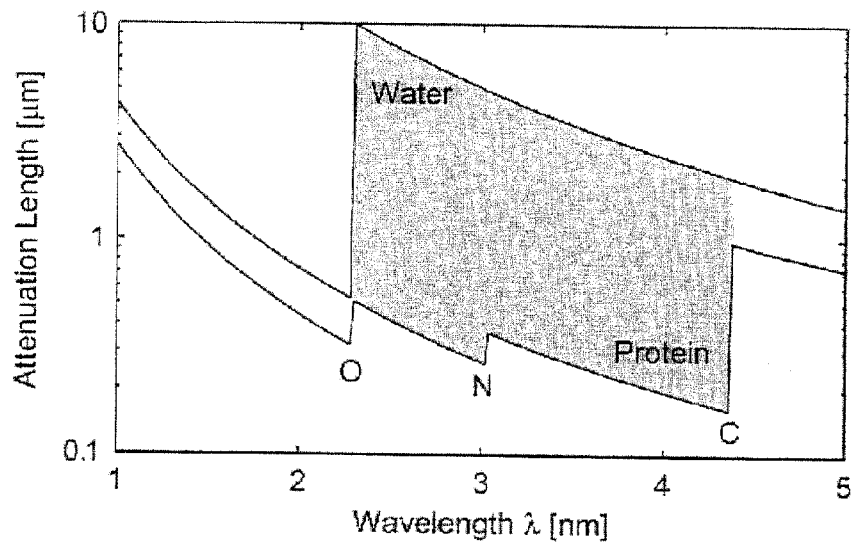
Figure 8:
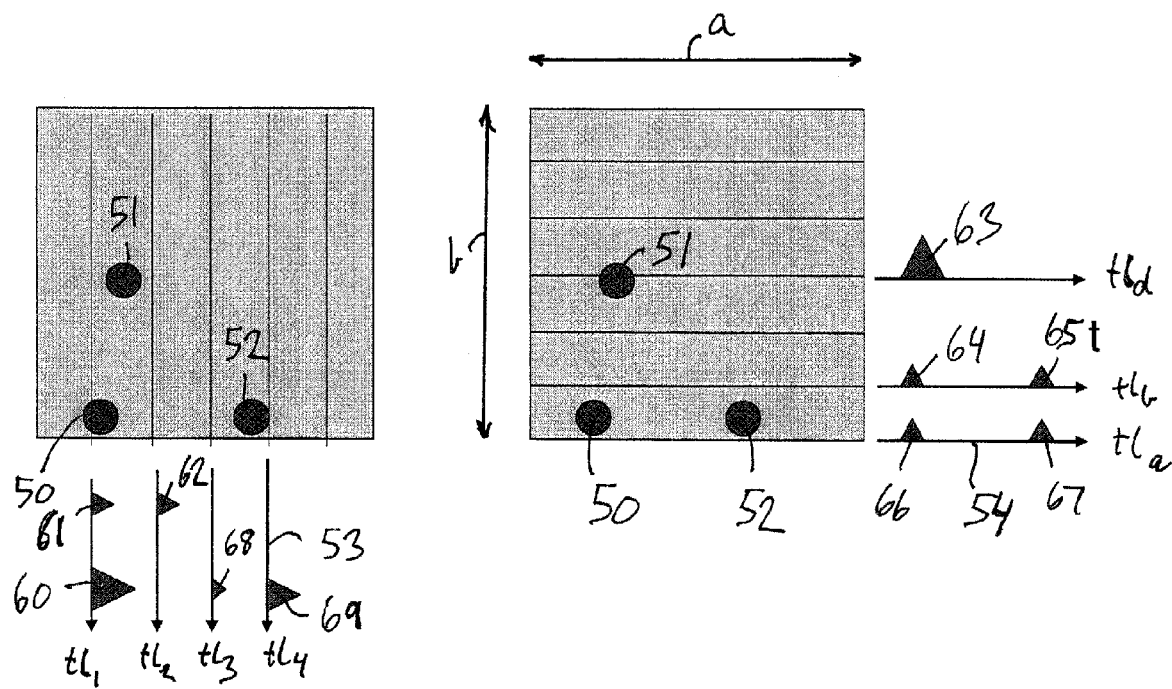

In the following, examples of embodiments are described in further detail, based on the highly schematic drawings, wherein, FIG. 1 illustrates a schematic overview of an embodiment of a detector element according to the invention, FIG. 1a illustrates an arrangement of processors on the detector element in several rows, for a few of the electrodes in a line-shaped set of electrodes, FIG. 2 illustrates a schematic cross section of an embodiment of a stack of detector elements according to the invention, FIG. 2a illustrates another embodiment of a stack of detector elements, FIG. 3 illustrates a schematic top view of an embodiment of a side-by-side arrangement of detector elements according to the invention, FIG. 4 illustrates a schematic overview of an embodiment of a materials mapping apparatus according to the invention, FIG. 5 illustrates a schematic overview of a different embodiment of a materials mapping apparatus according to the invention, FIG. 6 illustrates a schematic overview of another embodiment of a materials mapping apparatus according to the invention, FIG. 7 is a graph illustrating the water window, FIG. 8 are an illustration of information used in the reconstruction of an image, FIG. 9 is an example of a specimen carrier according to the invention, and FIG. 10 illustrates a section through another embodiment of a specimen carrier.

The term specimen or test specimen comprises any type of specimen, or sample, or material, or object, or segment, to be imaged or be probed using radiation and comprises specimens of various types such as ranging from metals to structures composed of various materials of non-organic type to samples or structures of organic material, and combinations of organic and non-organic matter.

In a first embodiment a detector according to the invention includes one or more detector elements 1 of a general configuration as illustrated in FIG. 1. The detector element 1 comprises a semiconductor detector material 2 and two sets 3a, 3b of line-shaped electrodes 4, one set 3a distributed on a top surface of the detector material 2 and the other set 3b distributed on a bottom surface of the detector material 2. The detector element 1 further comprises signal processors 5, and is placed on a supportive substrate 6, which in the illustrated embodiment is a silicon wafer. Substrate 6 has a recess in its lower side so that the thickness of substrate 6 is small in the area covered by the detector material 2, and in this manner the absorption in the substrate is minimized. It should be noted that dimensions illustrated on the drawing are not to scale, nor is the number of line-shaped electrodes illustrated correctly. In practical embodiments it is a desire to have a comparatively large detector area, such as an area of 1 $mm^2$, and in order to achieve that, the detector element is provided with several hundreds or even some thousands of electrodes. And although the signal processors are shown in general outline in FIG. 1 there is one signal processor connected to the individual electrode, and the row of signal processors required for the array of electrodes are located one after the other in the block-shaped area generally designated as signal processors 5 in FIG. 1.

The line-shaped electrodes 4 within each set 3a and 3b are placed extending parallel, or substantially parallel, to each other, and the line-shaped electrodes 4 are in the embodiment shown distributed with a strip pitch s of 1 µm. The strip pitch is generally defined as the distance from the left edge of one line-shaped electrode to the left edge of a neighbouring line-shaped electrode. Other values of the strip pitch s, lower than 3 µm, may be used. The individual line-shaped electrode 4 has, in the illustrated embodiment, a width w of about 100 nm and a thickness T2 of about 15 nm. The thickness T2 and the width w are indicated in FIG. 2. It is preferred that the width w is as small as possible to minimize direct absorption of incident energy in the line-shaped electrodes 4.

Each line-shaped electrode 4 extends from the block of semi-conductor detector material 2 onwards to a connection to the associated signal processor 5. The line-shaped electrodes 4 are made of a conducting material, such as gold, aluminium, or copper.

The signal processors 5 are in this embodiment larger than the strip pitch, and consequently the signal processors pertaining to the individual set of line-shaped electrodes are arranged in several rows at either side of the detector material. One arrangement is illustrated in FIG. 1a, and it has the advantage that all signal processors are of the same type and has the connection to the electrode located at the same location. Other arrangements are possible, such as arrangements where some of the signal processors are located further away from electrodes 4 in order to be provided with cooling.

The semiconductor detector material 2 has in the illustrated embodiment a thickness T1 of about 1 μm. The thickness is comparable with the strip pitch s, viz. T1=s. Other values for thicknesses not larger than three times the strip pitch (T1≤3×s) are possible. In principle any semiconductor material with a suitable direct band gap between the electron levels may be used, and the active detector area may be of any suitable size. When the detector is for use with e.g. hard x-rays the semiconductor material is preferably one with a high absorption coefficient for high energy photons, such as semiconductors comprising at least one constituent metallic element having an atomic number, Z, of more than 14. In the illustrated embodiment the detector material 2 is InP.

The detector element design of FIG. 1 provides an efficiency of about 1% with an incident radiation beam of 36 keV, and an energy resolution of approximately 0.5 keV for the said radiation of 36 keV. The individual signal processor 5 comprises in traditional, well-known manner signal collecting means and signal readout means (not illustrated), and are adapted to communicate signals via signal lines 29 to one or more central processing units 30 for further signal processing. The central processing unit 30 reconstruct an image based on the data received. Such reconstruction can take place according to various different methods, well-known in the art. One method is direct imaging (radiography) where the light received is simply allocated to the actual position detected, naturally apart from any corrections performed in order to remove scatter, artifacts and other quality improving measures. Another method is computerised tomography (CT) where the attenuation through the specimen is measured while the specimen is rotated around an axis perpendicular to the beam direction. And a third method is based on measurement of diffraction patterns.

The detector area has a width a and a breadth b (cf. FIG. 8), and the signal processors are preferably located outside the detector area so that a clean beam path is present in the detector area. In the stacked configuration depicted in FIG. 2 the detector areas of the individual detector elements are all aligned so that the resulting detector area corresponds to the detector area of the individual element.

The signal collecting means and signal readout means collect signals from the line-shaped electrodes 4 and read out the collected signals, for further signal processing, at a frame rate sufficiently fast to enable single particle detection. This means in one embodiment that the frame rate should be equal to or larger than the average number of deposited particles per electrode per second. The actual frame rate needed to accomplish this depends on the flux of particles during the radiation incident on the detector material 2, which in turn depends on the specific application to which the detector element 1 is used. In practice the signal collecting means and signal readout means should be able to deliver a readout frame rate of at least 8,000 frames per second (8 kfps). The presently available signal collecting means and signal readout means can operate at 100 MHz, which for typical applications provides considerably faster signal readout rates than presently required. It is of course an advantage to obtain higher frequencies, such as means operating at e.g. 140 MHz or higher.

In the illustrated embodiment every line-shaped electrode is read out for each frame. In a modified embodiment the signal collecting means and signal readout means activates the read out only when they carry current, so that selectively collecting and reading out is obtained. Since a signal collecting and readout means with this capability is only required to collect and read out signals from but a few electrodes per frame, it naturally has the potential of being considerably faster than a signal collecting and readout means reading out all line-shaped electrodes for each frame.

In the embodiment of FIG. 1 the detector element 1 comprises, in the general outline, two arrays of signal processors 5 for each set 3a, 3b of line-shaped electrodes, connected so to the electrodes, that the individual processor is connected to one end of the associated line-shaped electrode 4. The signal processors can be embodied in various well-known manners. The individual electrode is typically associated with its own set of signal processors, such as a charge sensitive preamplifier connected with a potential storage. The signal may be processed intermediately in shaping amplifiers or comparators, before readout to interface electronics. Interface electronics are well-known in the art, and can be made on a separate board or be included on the sensor wafer depending on the space requirements.

In another embodiment the individual line-shaped electrode is connected to two signal processors, one at either end of the electrode. In a further embodiment both ends of the individual electrode are connected to one signal processor, which is provided with two inlet contact points. This latter embodiment is not preferred because the layout of the electrodes outside of the detector material becomes less simple.

The signal processors 5 are preferably arranged in linear arrays, where the components of the processors 5, such as diodes, are distributed with a pitch of a size comparable to the strip pitch s. The signal processors 5 are preferably produced of silicon using the CMOS (Complementary Metal-Oxide Semiconductor) technology. The signal processors may alternatively be produced using other suitable electronics technologies, such as for instance the CCD (Charge Coupled Device) technology, or bionic technologies.

The individual detector element functions as follows: When an incident particle by impact with the detector material is absorbed in the detector material a resulting cascade of particles creating electron-hole pairs are formed within the detector material. The particles form a cloud having a Lambert like distribution with the centre point being the point of impact, i.e. the cascade of particles are approximately evenly distributed in all directions from the point of impact. The formed cloud of particles induces current in the line-shaped electrodes, the magnitude of the current being proportional to the distance of the line-shaped electrode from the point of impact. The induced current is collected by the signal collection means and the signal is readout by the signal readout means for further signal processing.

In the embodiment where each end of each line-shaped electrode is connected to a signal processor it is possible to estimate the point of impact by detecting the time difference between receipt of a signal at one end of the line-shaped electrode and receipt of a signal at the other end of the same electrode. This time difference can be used as a measure of the distance to the point of impact, because the elapsed time between induction and detection of a current is proportional to the distance between the point of impact and the signal processor. The signal processors can determine the position of impact of the incident photon based on the time delay of the read out signals, and they also have information on the magnitude of the signals.

In the case of a detector element having only one signal processor for each set of line-shaped electrodes connected to only one end of the line-shaped electrodes, e.g. as illustrated in FIG. 1a, the signals transmitted towards the open end of the wires, that is the end of the wire not connected to the one signal processor, will be reflected off the open end back towards the signal processor. Hence the position may be acquired from the time difference between the directly transmitted signal and the reflected signal, using a predetermined signal velocity along the electrode.

In case of a signal processor connected to both ends of the line-shaped electrodes, the processors will receive signal from both ends of each electrode and can determine the time delay accordingly. Alternatively, each processor can provide the signal with a time-stamp and sends it on to a central processing unit that determines the time delay and the position of impact.

Another possibility is to use the signal processors to utilize the rise time of the induced signal to estimate the resistance of the path along the electrode by using that the rise time is proportional to the product of the resistance of the path and the capacitance of the diodes. The path length travelled by the signal may then be calculated, for instance using Ohms law. Hence the signal processors, or a central processing unit, in this case calculate the position of impact of the incident particle based on the magnitude and the rise time of the read out signals.

A preferred manner of obtaining the exact position in between two pairs of electrodes is to use detected signal levels from several electrodes in centre of mass calculations (CMC). When determining the position of an incoming particle by performing CMC the spatial resolution can e.g. be a factor of ten better than the strip pitch of the line-shaped electrodes. Hence, with the detector element construction according to the embodiment of FIG. 1 where the strip pitch s is 1 μm, it is possible to obtain a spatial resolution of the order of 100 nm.

The detector material 2 can be manufactured using various methods, such as in the following manner: Initially a layer of a semiconductor material, for instance InP, is grown to the desired thickness T1 on a first substrate material generally being InP. A thin layer of In—GaAs is provided on the InP. Subsequently the first substrate material is removed, normally by etching, from the grown layer of semiconductor material, thereby obtaining a pure layer of semiconductor material which is doped with e.g. Fe. The pure layer of semiconductor material is then placed on a second substrate material generally being silicon.

Once the semiconductor material of thickness T1 has been placed on the second substrate, the one or more sets of line-shaped electrodes are written on at least one surface of said semiconductor material. If both sets of the line-shaped electrodes are provided on the same side of the substrate, an insulating layer has to be interposed between the two sets, at least in the areas of line intersection. In order to facilitate the manufacturing it is consequently preferred that the one set is written to one side of the material and the other set to the opposite side of the material.

The sets of line-shaped electrodes may be written using a lithographic method, such as preferably e-beam lithography, nano-imprint lithography or UV-lithographyE-beam writing is, inter alia, known from "Hydrogen silsesquioxane/novalak bilayer resist fro high energy aspect ratio nanoscale electron-beam lithography" by Falco C. et al, J. Vac. Sci. Technol. B 18(6), Nov./Dec. 2000, p. 3419-3423 where lines are written with a width of e.g. 25 nm. The detector material with its line-shaped electrodes is placed on a substrate, preferably being a silicon chip, comprising the signal processors, and the line-shaped electrodes and signal processor are connected, preferably during the writing procedure, or during a second writing procedure if the signal processors are mounted after the writing on the detector material itself. The part of said silicon chip situated directly below the semiconductor detector material is preferably thinned away to minimize absorption in the silicon.

FIG. 2 illustrates an embodiment where three detector elements 1 are arranged in a stacked configuration, held in supports 31. The stacking is made so that the blocks of detector material 2 are positioned so that their edges are in common planes, so that a central beam path free of processors obtains a width corresponding to the width of the individual detector material. FIG. 2a illustrates a slightly modified embodiment where the silicon chip has been thinned in an area larger than the area covered by the detector material, so that a more closely stacked configuration is obtained, because detector material on one detector element extends into the recess in the support material in the adjacent detector element.

FIG. 3 illustrates a detector comprising an array of four times four detector elements 1 of the embodiment shown in FIG. 1 placed in a side-by-side configuration. This configuration enables the construction of detectors having a larger detector area than the detector area of a single detector element 1.

It is of course also possible to combine the detector configurations of FIGS. 2 and 3 as desired.

A large number of embodiments of signal processors for obtaining and processing signals from electrodes in detectors for particle radiation are well-known in the art. Basically, the signal processors generally gather data and send data to a processing unit that process the data in connection with time delay algorithms, CMS algorithms, or reconstruction of the absorption event from electrode signals.

As an non-limiting example of electronic components, general purpose circuits for monolithic application specific integrated circuit ASIC may be mentioned. The ASIC was developed for medical imaging such as gamma camera and SPECT (Kravis et al., 1999). The chip has a self-trigger output so that random signals without an external trigger can be processed. ASIC can have several readout and data acquisition modes. The output signals from the channels can be multiplexed. The ASIC have different dynamic ranges and shaping times, fast timing, low power consumption etc. Other electronic components can also be used.

FIG. 8 illustrates signals obtained in the detector material of a single detector element embodied with two orthogonal sets of line-shaped electrodes. The three dark spots 50, 51 and 52 represent photons absorbed in the material. Generally, the photons are not distributed evenly across the detector but concentrated near the strong features in the image (high flux regions). The signals obtained in the line-shaped electrodes are illustrated on the lines 53, 54 in order to illustrate that the signal processors can receive information on: a) the amount of charge collected—represented by the amplitudes of the signals on lines 53, 54; b) the moment of receipt of the signals—represented as the position of the signals on the lines 53, 54 because lines 53, 54 are time lines, and possibly also c) the change rate of the signals—represented by the inclination of the illustrated signals.

With regard to the absorption of particle 51 timeline tl1 has first detected a strong signal 60 and a little later a weak signal 61, and time-line tl2 has detected only a weak signal 62 in the same moment that signal 61 registered in tl1. Based only on this information it is possible to resolve the signals received in tl1 and determine that the two signals in tl1 pertain to two different absorption events. And this can be verified by the signal 63 detected in tl1 at the same moment as signals 61 and 62 registered in tl1. In an embodiments where only the amount of charge is detected the amount registered for tl1 would be the total of signals 60 and 61, and then it would be required also to look at the signals 63 and 64-67 registered in tla, tlb and tld in order to detect that the signal in tl1 is actually a result of two events. There are consequently advantages in detecting the time variations of the signals because fewer comparisons need to be performed in order to discern one event from another.

The amount of charge received in the electrodes can be utilized to position the point of impact in between the electrodes. For particle 51 two even signals 61 and 62 are obtained, which shows that the point is about midway between the two electrodes. For particle 50 signal 60 and the lack of signals in the adjacent electrodes show that the particle was absorbed very closely to or at the line shaped electrode pertaining to tl1. And with respect to particle 52 the small amplitude of signal 68 in tl3 and the large amplitude of signal 69 in tl4 provide the information that the point of impact is closest to the line-shaped electrode pertaining to tl4.

The reconstruction algorithm estimates the positions of all possible particle interactions in every strip based on the measured time differences and correlations between the back and front positions are found. These are the real 2D interaction points of the absorbed particles.

For a detector having a detector area of 1 mm$^2$ and a strip pitch of 1 µm (1 micron) the reconstruction algorithm may discern about 50,000 different absorption events per readout cycle. In an embodiment using 37keV photons the absorption in a InP layer with a thickness of 1 µm is about 1%. When the readout from the electrodes is done in parallel with 100MHz the source may have a flux of less than $5 \times 10^{14}$ protons per second per mm$^2$. When the readout from the electrodes is done serially, the flux of the source should be less than $2.5 \times 10^{11}$ photons per second per mm$^2$.

FIGS. 4, 5 and 6 outlines three different embodiments of a materials mapping apparatus 10 according to the invention, each generally comprising a detector 16 with stacked detector elements, an apparatus housing 11, a test specimen support 17 supporting a test specimen 13 to be examined, and a source of radiation 14.

Among usable sources of radiation are for instance sources of X-rays exemplified in FIG. 4 by a synchrotron X-ray radiation source 14a, a source of extreme ultraviolet (EUV) radiation shown as 14b in FIG. 5, or a source of electrons shown as 14c in FIG. 6. For further details on sources and principles reference is made to the textbook "Soft X-Rays and Extreme Ultraviolet Radiation: Principles and Applications by Prof. David T. Attwood, Berkeley, Cambridge University Press.

An apparatus housing 11 is designed to protect the operator against the high-energy radiation source as well as to shield the apparatus from the surroundings during measurements. The housing has an opening through which a specimen 13 can be loaded into or taken out of the apparatus. The opening can be provided with a detachable or hinged closure or door.

The test specimen support 17 is preferably adjustable to enable positional adjustment on at least micrometer scale of the test specimen with respect to the beam path 15 for optimizing purposes. The adjustment may for instance be effected through micrometer screws or adjustment means controlled by piezoelectric elements (not shown). Furthermore the test specimen support 17 is preferably capable of supporting test specimens of different spatial structure with or without a container.

The materials mapping apparatus 10 according to the invention has an overall size suitable for use on a table 19 such as for instance a laboratory table.

The materials mapping apparatus 10 may comprise an imaging display device 33 or be connected to external image displaying means such as for instance a computer, which may be equipped for further processing of the information acquired from the apparatus 10.

As can be seen the materials mapping apparatus 10 the embodiments shown are free of optics in the beam path 15 between the source of radiation 14a, 14b, 14c and the specimen, and clean from optics between detector 16 and the specimen. This very clean setup reduces optical noise such as diffraction and non-linear effects, which may be caused by e.g. lenses, substantially by eliminating sources of such noise.

Examples of use of a materials mapping apparatus according to the invention are explained in the following.

The examples described below have a detector element according to the embodiment described above in relation to FIG. 1

EXAMPLE 1

Full Field Soft X-Ray Imaging

In soft x-ray imaging the so-called water window (see FIG. 7 "Compact Soft X-Ray Microscopy" by Per Takman), situated at 2.4-4.5 nm wavelength, presents a good opportunity to obtain contrast between water and proteins or other carbon containing materials. Photons with an energy of 250-500 eV will on impact in the detector material produce about 75-150 electron-hole pairs per photon, which is sufficient for center of mass calculation.

Examples of sources emitting photons at wavelengths within the water window are sources such as the ones based on the pinch plasma principle or on Laser Produced Plasma (LPP).

In this setup, illustrated in FIG. 5, the source 14 has a beam of 13 µm, and the source is placed about 39 mm from the sample. The cross-sectional area of the beam is preferably of the same size or larger than the detector area. The detector 16 is placed a short distance, for example 0.3 mm, from the specimen 13 further down the beam path. This preserves more flux from the source of radiation due to the tenfold decrease in source sample distance as compared to known techniques, while avoiding optical losses.

Due to the almost complete absorption of radiation at the above mentioned wavelengths in a 1 µm InP detector material a single layer design is preferred for a detector according to the invention suitable for this application.

EXAMPLE 2

Tomography at 33 keV—Determination of Exposure Time and Detector Absorption

The sample or specimen in FIG. 4 is illuminated with 33 keV particles, the energy being chosen such that the transmission of particles through the sample is about 20%. 33 keV electrons obtained form a synchrotron X-ray source. The photon distribution in the beam hitting the detector element is substantially homogenous.

When a signal hits a line-shaped electrode the signal processor selectively reads out the signal. The readout process takes about 5 ns, and the absorption of one single particle in the detector material induces a signal in between 2 and 6 line-shaped electrodes, the readout of one single particle in average takes about 20 ns.

At a resolution of 100 nm a signal will be assigned an area corresponding to $\frac{1}{10^8}$ of the total area of the detector element assuming a total area of 1 mm$^2$ as mentioned previously. To obtain an image taking advantage of the high resolution it is necessary to acquire a minimum of particle impact in each area of the abovementioned size. Hence to obtain a homogenous image it is necessary to detect about $10^8$ photons, and by using the principles of the above-mentioned algorithm capable of discerning multiple hits, and a serial readout, this may typically take about 4 milliseconds. A typical size for a signal needed in order to ensure a sufficient signal-to-noise ratio is obtained by collecting about 200 photons per image point. Hence a typical readout time in this case will be about 1 second.

While an image is read out from the detector element, the transmitted beam will be largely unpertubated, and may hence be detected in a subsequent detector element. Such a stacked configuration may be continued by subsequently adding detector elements as long as scattering events in the detector material do not deteriorate the signal carrying x-ray beam substantially. With for instance seventeen stacked detector elements the total absorption of the detector stack becomes 25% of a 33 keV X-ray, and the amount of scattered photons constitute only 0.5% of the beam, or less than 2% of the absorbed particles.

EXAMPLE 3

Measurement of Diffraction in a Crystal

During measurements a specimen crystal in form of a cylinder of 1 mm in diameter and 0.5 mm in height was used, and a source of X-rays having an energy of 50 keV was emitted in a beam path. The test specimen support used was capable of supporting a cylindrical test specimen, and to rotate the same about an axis perpendicular to the propagation direction of the beam path.

In far field measurements the detector element is placed at a distance of 15 cm from the specimen. The position of the detector element was adjusted so that it covered a peak in the loss of energy, known as a Bragg-peak. A resolution of 100 nm corresponded in this case to a variation in the crystal lattice of about 0.0003%, and will thus reveal information concerning minimal variations in the lattice.

When the detector is placed at a distance of 2 mm from the sample it may cover scattering in angles up to 20 degrees from the sample. Simultaneously the resolution of the orientation volume will be about 2.5 millidegrees. With such a placement it has been shown that one may obtain the exceptional achievement of high resolution in real volume and orientation volume simultaneously.

Due to the low perturbation of the X-ray in the detector according to the invention it is possible to place further detectors in a stacked configuration and/or to use a detector with lower resolution, but with a larger detector area thus covering several Bragg-peaks.

EXAMPLE 4

Cracks and Voids in Semiconductor Circuits

The high resolution and compact design of the detector and hence the materials mapping apparatus according to the invention along with the non-destructive probing of the sample with the use of penetrating particles enable fast and convenient imaging of cracks and voids in semiconductor circuits. Such features can be resolved directly with the materials mapping apparatus in the configuration used for tomography as described in example 2 above.

Voids and cracks have another distinct advantage in X-ray imaging, namely that they show very clearly when using phase contrast imaging. Phase contrast imaging requires a coherent beam and a distance from specimen to detector being large enough to receive an interference pattern from the contrast in the complex refractive index of the sample on the detector. Home-lab sources usable in connection with synchrotron radiation are available in relatively small sizes, e.g. as the Compact Light Source from the U.S.A. company Lyncean Technologies, Inc. Palo Alto, Calif.

It should be noted that the above description of preferred embodiments is merely an example. Details of the different embodiments may be combined into new embodiments within the scope of the claims. And variations can be made. As an example the detector material can be made with larger dimensions than the detector area so that the wafer of detector material overlaps substrate 6 to such an extent that substrate 6 need not be present in the detector area, because the detector material is self-carrying in the detector area. The line-shaped electrodes need not be straight lines. They can alternatively be placed in a curved pattern or a pattern composed of several straight sections. However, the pattern of straight, substantially parallel lines is preferred due to the simplicity of the resulting calculations in the reconstruction of the image.

FIG. 9 illustrates a cross-section through a bottom portion of a specimen carrier 70, preferably a carrier made of glass. The specimen carrier inner surface 71 has an area 72 of slightly larger size than the detector area of the detector 16. This area 72 is located at the bottom of a recess 73 in inner surface 71. Specimen 13 is located on the area 72. A lower surface 74 of the bottom of the specimen carrier 70 is provided with an upward extending recess 75 extending over a larger area than the specimen carrier surface. The area is so large that the recess 75 fits over the complete protruding portion of the detector 16. Detector 16 is protruding from surface 76, which is a horizontal surface within the apparatus 10 (FIG. 5). At either side of the protruding detector, the surface 76 is provided with an outward facing, bevelled surface 77, 78, and these surfaces act as guide surfaces for positioning the specimen in relation to the detector area. Specimen carrier 70 has in the lower surface of the bottom at least one bevelled guide surface that mates with the corresponding guide surface(s) 77, 78 when the carrier is positioned over the detector element.

The specimen carrier can have a cover 80 or a lid protecting the specimen. In a preferred embodiment the cover has a recessed area 81 of small wall-thickness located above the recess 73 so that only a small amount of carrier material is present in the beam path.

If a sterile atmosphere is desirable, the cover or lid can be sealed to specimen carrier 70, such as by use of an adhesive on inner surface 71, or on the inner surface 82 of cover 80. If a larger volume is required in the enclosed space above the specimen, the specimen can be placed in a dish 90 having a lid 91 like the one illustrated in FIG. 10. One or more clamps 92 connect the two parts, and a sealing member, such as an O-ring 93 in a recess ensures an efficient sealing off of the volume within the specimen carrier. In case the specimen is at sterile conditions in the specimen carrier, the sterility is maintained throughout the imaging process. This embodiment of the specimen carrier has also a diminutive wall thickness, such as less than 0.2 mm in the areas to be positioned in the beam path.

Additional aspects of the invention can be expressed in the following points of definition that are applicable either in combination with the various embodiments of the invention as defined in the appended claims, or as individual definitions of the scope of the aspect of the invention independent from the invention defined in the appended claims:

A first additional aspect is related to the specimen carrier, which is adapted to facilitate imaging of samples, such as samples of biological matter, with high special resolution. The below mentioned specimen carriers allow the specimen to be placed very close to the detector while an image is aquired, and this improves the image quality.

A1. A specimen carrier for use in the above-mentioned apparatus, comprising a specimen carrier surface having a wall thickness of less than 0.2 mm, which specimen carrier surface preferably is provided as a recessed area in a bottom wall of a specimen container.

A2. A specimen carrier of the type mentioned in A1, wherein the specimen carrier is a container that may be closed or sealed of from the surroundings after placement of a specimen on the specimen carrier surface.

A3. A specimen carrier of the type mentioned in A1 or A2, wherein the specimen carrier surface has an area of at least the same size as the detector area in the detector according to the present invention.

A4. A specimen carrier of the type mentioned in any of points A1 to A3, wherein the lower surface of the bottom of the specimen carrier is provided with an upwards extending recess extending over a larger area than the specimen carrier surface.

A5. A specimen carrier of the type mentioned in any of points A1 to A4, wherein the lower surface of the bottom of the specimen carrier is provided with at least one guide surface for positioning the specimen in relation to a detector element.

A second additional aspect is related to a combination of a detector and a specimen carrier, aiming at facilitating imaging of samples, such as samples of biological matter, with high special resolution.

B1. The combination of a detector and a specimen carrier, wherein the specimen carrier has a specimen carrier surface with a wall thickness of less than 0.2 mm.

B2. The combination mentioned in point B1, wherein the specimen carrier surface is provided as a recessed area in a bottom wall of a specimen container.

B3. The combination mentioned in point B1 or B2, wherein the specimen carrier surface has an area of at least the same size as a detector area in a detector.

B4. The combination mentioned in any of points B1 to B3, wherein the lower surface of the bottom of the specimen carrier is provided with an upwards extending recess extending over a larger area than the specimen carrier surface.

B5. The combination mentioned in any of points B1 to B4, wherein the lower surface of the bottom of the specimen carrier is provided with at least one guide surface for positioning the specimen in relation to a detector element.

The invention claimed is:

1. A detector for detecting particle radiation of an energy in the range of 150 eV to 300 keV, said detector having at least one detector element, which detector element comprises a semiconductor detector material in a detector area, at least one set of line-shaped electrodes, which electrodes extend in the detector area and are conductively connected to at least one surface of the semiconductor detector material, and signal processors communicating with said line-shaped electrodes, wherein the individual set of line-shaped electrodes comprises a plurality of line-shaped electrodes, which in the individual set are distributed with a strip pitch of at the most 3 µm, wherein the semiconductor detector material has a thickness (t) of at the most three times the strip pitch (s) of said line-shaped electrodes, and wherein the signal processors comprise signal collecting means and signal readout means, which signal readout means have a read out capability of at least 8,000 frames per second (8 kfps).

2. Detector as claimed in claim 1, wherein the detector has a processing unit with a filter for Compton scattered particle activity and/or high-energy fluorescence activity.

3. Detector as claimed in claim 1, wherein the line-shaped electrodes in the individual set are distributed with a strip pitch of less than 2 µm.

4. Detector as claimed in claim 3, wherein the individual line-shaped electrode has a width of at the most 20 percent of the strip pitch of said line-shaped electrodes.

5. Detector as claimed in claim 1, wherein the semiconductor detector material comprises at least one constituent metallic element having an atomic number (Z) higher than 14.

6. Detector as claimed in claim 1, wherein said semiconductor detector material is selected from the group comprising InP, CdZnTe, CdTe, $HgI_2$, GaAs, $PbI_2$, TlBr, $BiI_3$, HgCdTe, HgZnTe or combinations PbTe, HgTe/CdTe and hgTe/ZnTe.

7. Detector as claimed in claim 1, wherein said the detector element comprises at least two sets of line-shaped electrodes.

8. Detector as claimed in claim 1, wherein the signal readout means have a read out capability of at least 40,000 frames per second (40 kfps).

9. Detector as claimed in claim 1, wherein said signal processors, or a number of central processors, are adapted to determine a position of impact of an incoming particle with a better spatial resolution ($\sigma$) than the strip pitch (s) of said line-shaped electrodes.

10. Detector as claimed in claim 9, wherein said signal processors, or a number of central processors, determine the position of impact of the individual particle by centre of mass calculations based on signals from a plurality of the line-shaped electrodes.

11. Detector as claimed in claim 9, wherein the signal processors, or a number of central processors, determine the position of impact of the individual particle by using time dependent signals from at least one line-shaped electrode.

12. Detector as claimed in claim 9, wherein the signal processors, or a number of central processors, determine the position of impact of the individual particle by using a combination of time dependent signals from at least one line-shaped electrode and either the signal strength from at least two line-shaped electrodes or centre of mass calculations based on signals from a plurality of the line-shaped electrodes.

13. Detector as claimed in claim 1, wherein said signal collecting means collect selectively from line-shaped electrodes that carry current.

14. Detector as claimed in claim 1 and having a plurality of detector elements in a side-by-side configuration.

15. Detector as claimed in claim 1, wherein a plurality of detector elements is mounted in a stacked configuration.

16. Detector as claimed in claim 15, wherein two or more stacks of detector elements are mutually spaced apart in the propagation direction of the beam.

17. Detector as claimed in claim 1, wherein two or more detector elements are mutually spaced apart in the propagation direction of the beam.

18. Materials mapping apparatus, comprising a source generating a beam of particles in a beam path, a test specimen support positioned at the beam path, and a detector, wherein the detector is a detector as claimed in claim 1.

19. Materials mapping apparatus according to claim 18, wherein the detector is located at a distance of less than 20 mm downstream in the direction of the beam path from the test specimen support, and that the source emits photons having an energy in the range from 200 to 600 eV.

20. Materials mapping apparatus according to claim 19, wherein the test specimen is in a sealed chamber.

21. Materials mapping apparatus according to claim 19, wherein the detector is at a shorter distance from the test specimen than the source, said test specimen including proteins or other materials containing carbon.

22. Materials mapping apparatus according to claim 18, wherein the beam path between the source and the detector is free of optics.

23. Materials mapping apparatus according to claim 18, wherein the detector is located less than 0.6 mm from the test specimen during exposure of the image.

24. Materials mapping apparatus according to claim 23, wherein the test specimen support includes a specimen carrier surface having a wall thickness of less than 0.2 mm.

25. Materials mapping apparatus according to claim 24, wherein the specimen carrier surface is provided as a recessed area in a bottom wall of a specimen container.

26. Materials mapping apparatus according to claim 18, wherein the detector is adapted to absorb at least 80 percent of the dose of radiation passing through the specimen during exposure.

27. Materials mapping apparatus according to claim 18, wherein the detector includes a plurality of detector elements located in the beam path in a stacked configuration, and wherein the source emits particles having an energy in the range from 8 keV to 80 keV.

28. Detector as claimed in claim 1, wherein the line-shaped electrodes in the individual set are distributed with a strip pitch of about 1 μm.

29. A detector for detecting particle radiation of an energy in the range of 150 eV to 300 keV, said detector having at least one detector element, which detector element comprises a semiconductor detector material in a detector area, at least one set of line-shaped electrodes, which electrodes extend in the detector area and are conductively connected to at least one surface of the semiconductor detector material, and signal processors communicating with said line-shaped electrodes, wherein the individual set of line-shaped electrodes comprises a plurality of line-shaped electrodes, which line-shaped electrodes in the individual set are distributed with a strip pitch of less than 2 μm, and wherein the semiconductor detector material has a thickness (t) of at the most three times the strip pitch (s) of said line-shaped electrodes.

30. Detector as claimed in claim 29, wherein the signal processors comprise signal collecting means and signal readout means, which signal readout means have a read out capability of at least 8,000 frames per second (8 kfps).

31. Detector as claimed in claim 29, wherein a position of impact of an incoming particle is determined with a better spatial resolution (σ) than the strip pitch (s) of said line-shaped electrodes.

32. Detector as claimed in claim 29, wherein a position of impact of an incoming particle is determined with a spatial resolution (σ) of σ<s/4, s being the strip pitch (s) of said line-shaped electrodes.

33. Detector as claimed in claim 29, wherein the individual line-shaped electrode has a width of at the most 20 percent of the strip pitch of said line-shaped electrodes.

34. Detector as claimed in claim 29 and having spatial resolution in two directions (2D) below 100 nm.

35. A detector for detecting particle radiation of an energy in the range of 150 eV to 300 keV, said detector having at least one detector element, which detector element comprises a semiconductor detector material in a detector area, at least one set of line-shaped electrodes, which electrodes extend in the detector area and are conductively connected to at least one surface of the semiconductor detector material, and signal processors communicating with said line-shaped electrodes, wherein the individual set of line-shaped electrodes comprises a plurality of line-shaped electrodes, which line-shaped electrodes in the individual set are distributed with a strip pitch of less than 2 μm, and wherein the signal processors comprise signal collecting means and signal readout means, which signal readout means have a read out capability of at least 8,000 frames per second (8 kfps).

\* \* \* \* \*